March 12, 1957 J. J. ADAMS 2,785,302
AUTOMATIC GAIN CONTROL WITH NOISE LIMITER APPLICATION
Filed Dec. 19, 1955
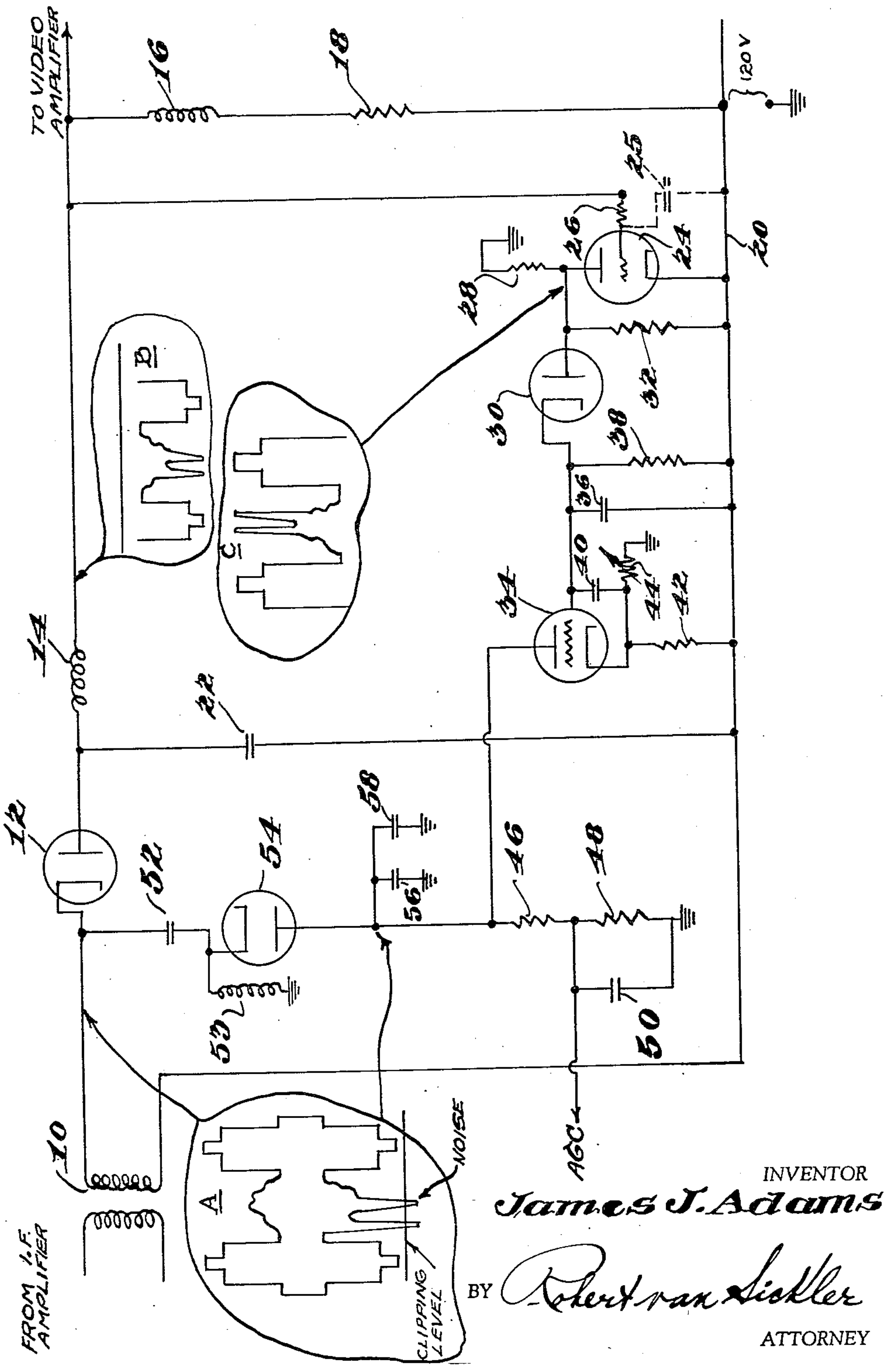
INVENTOR
James J. Adams
BY Robert van Sickler
ATTORNEY United States Patent Office 2,785,302
Patented Mar. 12, 1957

2,785,302

AUTOMATIC GAIN CONTROL WITH NOISE LIMITER APPLICATION

James Jewett Adams, Tucson, Ariz.

Application December 19, 1955, Serial No. 553,970
7 Claims. (Cl. 250—20)

This application relates to an automatic gain control with a noise limiter and more particularly to a circuit of this type for use in television receivers.

Modern television receivers employ automatic gain control circuits for varying the gain of one or more stages of R. F., I. F., and video amplification in accordance with the strength of the received television signal. Such circuits are employed to compensate for the difference in signal strength of the various signals which may be received on corresponding channels available at a particular receiving location. They are also employed to compensate for other signal strength variations which may occur, for example, the familiar flutter effect caused by nearby airplanes.

The automatic gain control circuits of the prior art, for the most part, are responsive to the detected signal at the output of the video detector or to a signal at the output of an automatic gain control detector specifically provided for that purpose. In order to conserve tubes, it is common to employ a circuit of the former type. In the conventional type of automatic gain control circuit, a relatively steady potential is produced in accordance with the peak amplitude of the video signal. This potential is applied to one of the elements of one or more stages of amplification in order to vary the gain of such stages in accordance with the strength of the incoming signal.

One of the defects of the prior art automatic gain control circuits is that they absorb power from the synchronization pulses and therefore interfere with the maintenance of proper synchronization, particularly on weak signals. Another defect of the prior art circuits is that they are subject to undesirable operation in response to noise peaks which may be superposed upon the video signal. The present invention obviates these and other defects of the prior art and provides a particularly simple and efficient automatic gain control circuit which is relatively unresponsive to noise pulses.

Accordingly, it is a primary object of the invention to provide a unique television circuit.

Another object of the invention is to provide a novel automatic gain control.

A further object of the invention is to provide an automatic gain control circuit incorporating a noise limiter.

An additional object of the invention is to provide an automatic gain control circuit which does not absorb power from synchronization pulses.

Still another object of the invention is to provide an automatic gain control circuit which is unresponsive to noise peaks.

The foregoing objects of the invention are accomplished by providing a unique circuit responsive to the detected video signal for producing an automatic gain control potential dependent upon the strength of the detected signal. The automatic gain control circuit is isolated from the video detector so that it does not absorb power from the synchronization pulses. Moreover, the invention incorporates a noise eliminator which clips noise peaks extending substantially above the level of the synchronization pulses. Since the height of the synchronization pulses varies with the strength of the incoming signal, it is essential that the clipping level vary accordingly. The circuit of the present invention provides, and it is accordingly an object of the invention to provide, a clipping level which varies with the strength of the detected video signal.

These and other objects of the invention will become more apparent from the following detailed description of the invention when taken in conjunction with the accompanying drawing in which The figure is a circuit diagram of a preferred form of the invention and includes typical wave forms as they might appear at particular points in the circuit.

Referring now to the drawing, the signal from the intermediate frequency amplifier may be coupled by a transformer 10 to the cathode of a video detector tube 12, at the input of which the wave form may appear as indicated at A. The video detector may be a conventional diode, and in many of the modern television receivers crystal diodes are employed. The plate of the video detector is coupled to the video amplifier through a conventional series peaking coil 14. A shunt peaking coil 16 may be employed in series with a resistor 18, one end of which is connected to a negative supply voltage on conductor 20. Resistor 18 constitutes the load for detector 12. An I. F. by-pass condenser 22 is employed in the conventional manner.

The output of the video detector 12 is also coupled to the control grid of a buffer amplifier tube 24 through a resistor 26. The cathode of this tube may be connected directly to conductor 20, and the plate may be grounded as indicated through a plate load resistor 28. The envelope of the detected video signal is indicated at B, while the signal at the plate of amplifier 24 is indicated at C. The positive signal at the plate of amplifier 24 is coupled to the plate of a rectifier 30, which may be a simple diode, across a resistor 32 connected in parallel with tube 24. It will be noted that resistors 28 and 32 constitute a voltage divider across the negative supply on conductor 20, and the junction of the resistors is connected to the plate of amplifier 24 and the plate of diode 30. The cathode of diode 30 is connected to the grid of an automatic gain control amplifier 34 and to one terminal of a condenser 36. Condenser 36 is charged through rectifier 30 from the negative supply on conductor 20, and discharges through a resistor 38 connected thereacross. The time constant of the network including condenser 36 and resistor 38 is chosen so that the potential on the upper terminal of the condenser remains substantially constant between the synchronization pulses.

The grid of tube 34 is by-passed to the cathode for I. F. signals by a by-pass condenser 40. The cathode of this tube is connected to conductor 20 through a cathode load resistor 42 and is connected to ground through an adjustable resistor 44. Resistors 42 and 44 constitute a voltage divider across the negative supply on conductor 20 and resistor 44 is employed to vary the gain of tube 34 so as to provide a slightly negative automatic gain control potential in the absence of an input signal. The plate of tube 34 is connected to one end of a resistor 46, which is in series with resistor 48, in turn connected to ground. The potential across resistor 48 is employed for automatic gain control, and a condenser 50 thereacross filters minor variations in the automatic gain control potential. It should be noted at this point that the circuit including tubes 24, 30, and 34 is direct coupled from the grid of tube 24 to the plate of tube 34.

The secondary winding of transformer 10 is connected through a condenser 52 to the cathode of a noise limiter tube 54 illustrated as a simple diode. The cathode of this tube is grounded for D. C. through a choke coil 53. The plate is connected to the upper terminal of resistor 46, that is, the same terminal to which the plate of tube 34 is connected. Condensers 56, and 58 connected between the plate of tube 54 and ground are employed, respectively, to filter variations in the automatic gain control potential and to by-pass any intermediate frequency signals.

In operation of the invention, signals from the output of the I. F. amplifier are detected by detector 12, and the negative portion of the video envelope appears at the plate of this tube as indicated at B. This signal is applied to the control grid of buffer amplifier 24. The amplifier isolates the automatic gain control circuit from the output of the video detector and thus prevents absorption of power from synchronization pulses by the automatic gain control circuit. Tube 24 also amplifies the signal applied to its grid and inverts the same for application to the plate of the rectifier 30. Rectifier 30 acts as a charging tube and allows condenser 36 to charge to a potential proportional to the peak of the detected video envelope. In practice resistors 28 and 32 are chosen to be somewhat smaller in value than resistor 38 so that rectification is efficient. The ratio of resistor 28 to resistor 32 is chosen so that the cutoff to tube 24 will be about the same level as the cutoff of the video amplifier (which may be about 3 volts).

The potential across condenser 36 is applied to the grid of tube 34, and an amplified version of this potential appears at the plate of this tube. A portion of this potential (that appearing across resistor 48) is employed to vary the gain of the various stages of amplification. The potential across resistors 46 and 48 in series determines the clipping level for noise limiter 54. The clipping level and typical noise spikes are indicated at A. In the absence of noise, diode 54 is normally non-conducting. However, if a noise spike is applied to the cathode of diode 54 through condenser 52 and if this spike exceeds the clipping level, diode 54 will become conductive and will pass the noise pulses to ground through condensers 56 and 58. The noise pulses will thus be prevented from interfering with the operation of the automatic gain control circuit so as to produce undesirable changes in contrast of the image on the kinescope. In addition, the output impedance 48 of the automatic gain control circuit is preferably made quite low (for example 1,000 ohms) so that the low impedance is effective to prevent large noise pulses from varying the automatic gain control bias. The control grids of the I. F. amplifier tubes, for example, are normally biased slightly negative. If resistor 48 had a large value, noise spikes which drive the grids positive, causing grid current to flow, would create an undesirably high negative bias across resistor 48, which would be maintained by condenser 50 in the manner of grid leak bias. Moreover, resistor 26 and the distributed grid capacitance 25 form a filter which tends to by-pass sharp noise spikes which may reach tube 24.

Variations in signal strength are reflected as corresponding variations in the potential across condenser 36 and in the automatic gain control potential across resistor 48. It will thus be apparent that the gain of the various stages of amplification to which automatic gain control potentials are applied is varied in accordance with the signal strength. Moreover, as the level of the incoming signal increases, the clipping level is changed accordingly and automatically so that synchronization pulses are not clipped. For weak signals, the clipping level is reduced so that the noise spikes are clipped as close to the tops of the synchronization pulses as is practical. If desired, delay means, such as a diode, may be employed to produce a delayed automatic gain control in the conventional manner.

In a typical embodiment of the invention the following component types and values may be employed:

| Ref. No. | Type or Value | Ref. No. | Type or Value |
|---|---|---|---|
| 12 | Germanium Diode | 22 | 10 $\mu\mu f$. |
| 24 | ½ 12AU7 | 36 | .1 $\mu f$. |
| 30 | Germanium Diode | 40 | .005 $\mu$. |
| 34 | ½ 12AU7 | 50 | 10 $\mu$. |
| 54 | Germanium Diode | 52 | .001 $\mu$. |
| 14 | Peaking Coil | 56 | .005 $\mu$. |
| 16 | do | 58 | 5 $\mu$. |
| 53 | Choke Coil | | |
| 18 | 8200 ohms | | |
| 26 | 10,000 ohms | | |
| 28 | 22,000 ohms | | |
| 32 | 22,000 ohms | | |
| 38 | 100,000 ohms | | |
| 42 | 10,000 ohms | | |
| 44 | 33,000 ohms (approx.) | | |
| 46 | 5,000 ohms | | |
| 48 | 1,000 ohms | | |

While a preferred embodiment of the invention has been illustrated and described, it will be apparent to those skilled in the art that this embodiment is subject to many modifications without departing from the principles of the invention. Accordingly, this embodiment is to be considered illustrative rather than restrictive of the invention, and any modifications which fall within the range of equivalents are intended to form a part of the invention.

What I claim as my invention is:

1. An automatic gain control circuit for a television receiver or the like which includes a detector to which a modulated high frequency signal is applied, comprising an amplifier having its input connected to the output of said detector, a condenser, a rectifier connected between one terminal of said condenser and the output of said amplifier, a power supply connected between the other terminal of said condenser and the output of said amplifier, a second amplifier responsive to the potential on said condenser, an impedance connected to the output of said second amplifier, noise clipper means connected between said detector and said impedance, and means for deriving a gain control potential from said impedance.

2. The circuit of claim 1, further including means for adjusting the gain of said second amplifier manually.

3. The circuit of claim 1, said noise clipper means comprising a rectifier having its input coupled to the input of said detector and its output coupled to the output of said second amplifier, and noise by-pass means connected to the output of said clipper means.

4. The circuit of claim 3, the input of said noise clipper means being coupled to said detector by a condenser.

5. The circuit of claim 1, said deriving means comprising a connection across a low impedance portion of said impedance.

6. The circuit of claim 1, the first-mentioned amplifier having an impedance means connected between its input and the output of said detector for reducing the effect of noise pulses at its input.

7. The circuit of claim 1, including a resistor connected across said condenser.

References Cited in the file of this patent

UNITED STATES PATENTS 2,171,636 Seeley ---------------- Sept. 5, 1939
2,240,593 Wilson ---------------- May 6, 1941
2,299,292 Allen ---------------- Oct. 20, 1942